INVENTOR.
HERMAN V. FERGURSON,
BY
Berman, Davidson & Berman
ATTORNEYS.

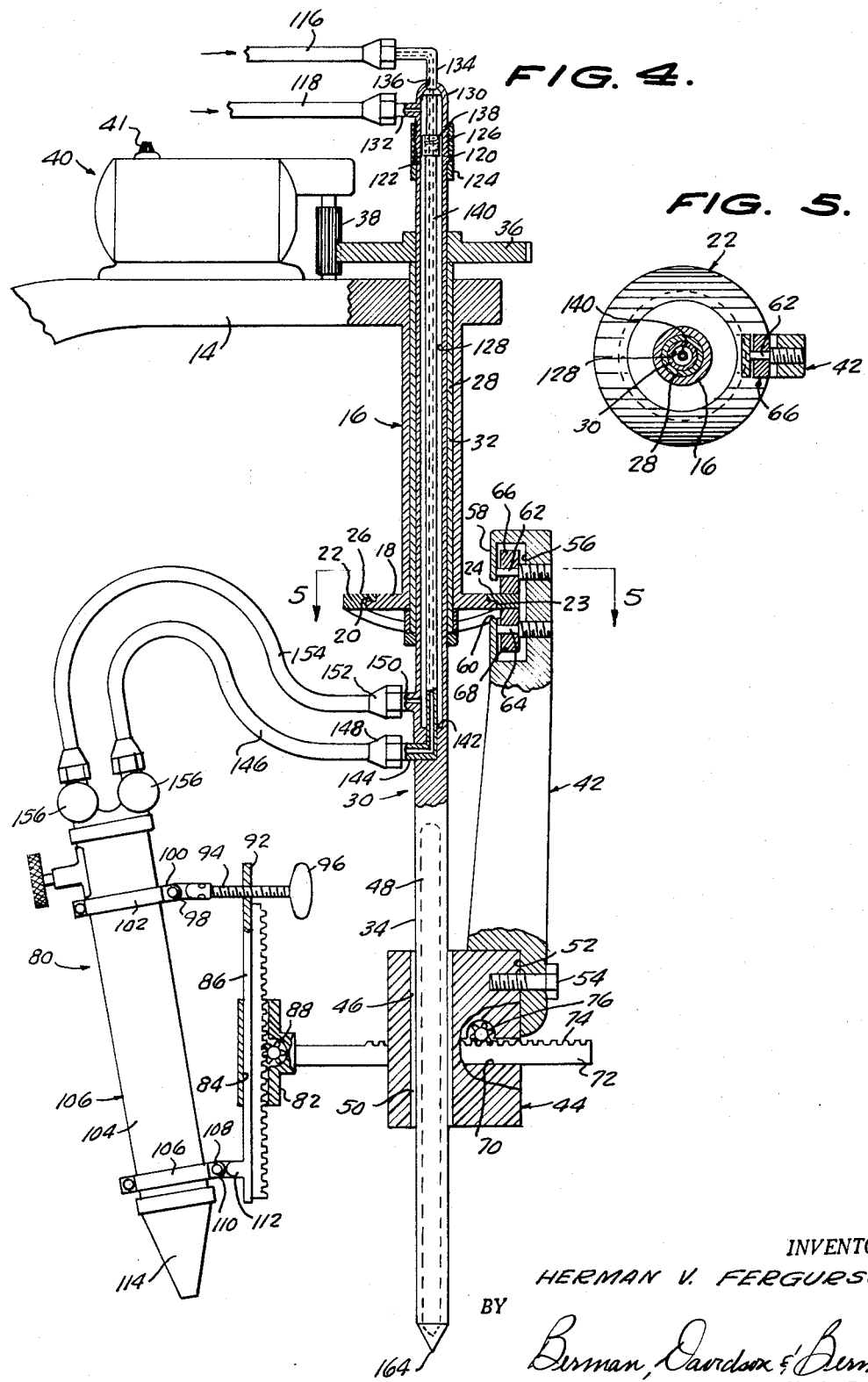

United States Patent Office

3,388,901
Patented June 18, 1968

3,388,901
FLAME CUTTER CARRIED BY ANNULAR CAM
RING AND ROTATING RADIUS ROD
Herman V. Fergurson, 4504 Valentine,
Fort Worth, Tex. 76107
Filed June 3, 1966, Ser. No. 555,088
8 Claims. (Cl. 266—23)

This invention relates to a flame cutter for metal forms, and more particularly to a flame cutter designed for cutting holes, such as saddling holes in pipe and other forms.

The primary object of the invention is the provision of a simple and efficient device of the kind indicated, which is adaptable to cut saddle holes in the sides of pipe and saddle seats in the ends of pipes, and to cut round holes in flat metal forms.

Another object of the invention is the provision of a device of the character indicated above, having a frame which is clampable to a pipe, or other object, in which a hole or seat is to be cut, a rotatable radius member on the frame, adapted to engage the object, at right angles thereof, and a lateral cutting torch assembly which is mounted on the radius member, for cutting the object, the torch assembly being slidable lengthwise of the radius member so as to conform the flame of the torch assembly to the contour of such as a pipe, this conformance being obtained and controlled by cam means as the torch assembly is rotated, and motor means on the frame for rotating the torch assembly. A further object of the invention is the provision of a device of the character indicated above, wherein the torch assembly is adjustable toward and away from the radius member so as to predetermine the diameter of a hole to be cut, and is adjustable toward and away from the work.

In the drawings:

FIGURE 4 is a fragmentary vertical longitudinal section, taken on the line 4—4 of FIGURE 1; and, FIGURE 5 is a horizontal section, taken on the line 5—5 of FIGURE 4.

Figure 1:
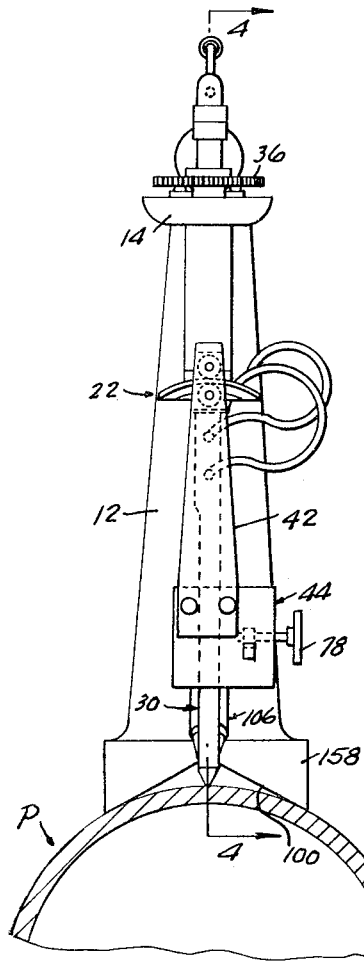
FIGURE 1 is an end elevation, showing a device of the invention mounted on a pipe, shown in section and broken away.

Referring in detail to the drawings, the illustrated device comprises an inverted L-shaped frame 10, having a standard 12, terminating, at its outer end in a lateral arm 14. The arm 14 has preferably integral therewith and extending inwardly therefrom, a fixed tubular housing 16, having a fixed circular lateral flange 18, on its inward end, which is formed with an outwardly opening annular groove 20 in its peripheral edge. An annular cam ring 22, having a peripheral groove 23, in its inner edge, defining an annular bead 24, received removably in the groove 20. The cam ring 22, where the device is to be used to cut a hole in the sidewall of a pipe P, has waved contour 26, conforming in contour to the curvature of the surface of the pipe. Where the device is to be used to cut a hole in a flat form, a flat cam ring is adapted to be substituted for the cam ring 22.

The housing 16 is fitted with a tubular bearing 28, extending the length thereof, through which is journalled the upper part of a radius rod 30. The rod 30 has a tubular upper portion 32, and a solid lower portion 34. A gearwheel 36 is suitably fixed on the upper portion 32, above the frame arm 14, and bears upon the upper end of the housing 16, and is meshed with a pinion 38, driven by an electric motor 40, fixed upon the frame arm. The motor 40 is of the variable speed type, and has suitable speed-varying means 41, associated therewith, for rotating the radius rod 30, at different desired speeds.

A cam arm 42, extending along and spaced laterally from the rod 30, is fixed to and extends upwardly from a cam arm block 44, having a polygonal bore 46, which slidably receives the lower portion 34, of the rod 30, having a flat side 48 nonrotatably engaging the portion 34. The bore 46 is equipped with a tubular bearing 50. As shown in FIGURE 4, the cam arm 42 is notched, as indicated at 52, to receive the outer corner of the block 44, and stud means 54 is passed through the arm and threaded into the block. Adjacent its outer end, the cam arm 42 is formed with a transverse slot 56, whose laterally inward wall 58 is formed with an opening 60, receiving the cam ring 22. Upper and lower journal pins 62, 64, respectively, extend across the slot 56, above and below the cam ring, and carry upper and lower rollers 66, 68, engaged with the upper and lower surfaces of the cam rings.

The cam arm block 44 is formed with a polygonal bore 70, extending crosswise, at one side of the radius rod 30, through which slides a rack bar 72, having outwardly facing teeth 74, which are in mesh with a pinion 76, journalled in the block, and having an adjusting wheel 78, on its outer end, the rotation of which moves the rack bar endwise, in either direction, for adjusting the lateral spacing, relative to the radius rod 30, of a cutting torch assembly 80.

The torch assembly 80 comprises a housing 82, formed on the outer end of the rack bar 72, and formed, lengthwise thereof, with a polygonal bore 84, through which slides a rack bar 86, disposed parallel with the radius rod 30. A pinion 88 is engaged with the rack bar 86, and has an external knob 90, for rotating the pinion and moving the bar 86 endwise. An ear 92, on the outer end of the housing 82, has a screw 94 threaded therethrough and provided, on its laterally inward end, with a wing 96.

At its laterally outward end, the screw 94 is pivoted, as indicated at 98, to an ear 100, on the adjacent side of an upper clamp ring 102, embracing the outer end of the barrel 104, of a torch 106. A similar clamp ring 106, on the inner end of the barrel 104, has an ear 108, which is pivoted, as indicated at 110, to a lateral arm 112, on the inner end of the rack bar 86. Rotation of the screw 94, in opposite directions, determines the angle of the torch 106, relative to the axes of the radius rod 30, and hence the diameter of the hole to be cut in the work. Adjustment of the rack bar 86, endwise, provides for adjusting the torch 106 toward and away from the work. The torch barrel 104 terminates, at its inner end, in a tapered nozzle 114.

Torch fuel, such as a combination of oxygen and acetylene, is supplied to the torch 106, through pipes 116 and 118, leading from suitable sources. The radius rod 30 has a lateral flange 120, on its upper end, which is rotatably engaged in a groove 122, in a tubular swivel 124, circumposed on the rod. The swivel has an internally threaded upper portion 126, extending above and registered with the bore 128, of the rod 30, into which is threaded the lower part of a hollow cap 130. The cap 130 has a fixed lateral nipple 132 to which the acetylene pipe 118 is connected. The oxygen pipe 116 has a portion 134 engaged through an opening 136, in the dome of the cap 130, the inner end of which is rotatably coupled, as indicated at 138, to the outer end of an oxygen pipe extension 140. This arrangement enables the pipes 116, 118 to remain stationary when the rod 30 is rotated.

The oxygen pipe extension 140 is circumferentially spaced from the wall of the radius rod bore 128, traverses the inner end 142, of this bore, and terminates in a lateral nipple 144, to which an oxygen hose 146 is coupled, as indicated at 148. The rod 30 has a lateral nipple 150, communicating with its bore 128, to which is coupled, as indicated at 152, an acetylene hose 154. The hoses 146 and 154 are connected, at their outer ends, to the outer end of the torch barrel 104, and have individual valves incorporated therein, having external adjusting knobs 156.

Figure 2:
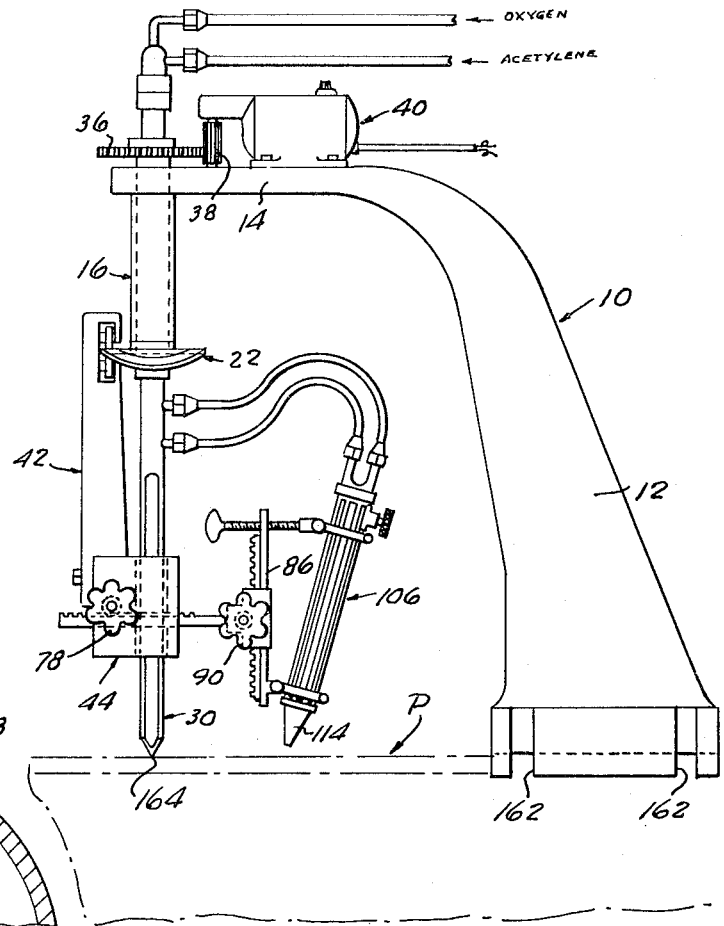
FIGURE 2 is a side elevation of FIGURE 1, the pipe being shown in phantom lines.
Figure 3:
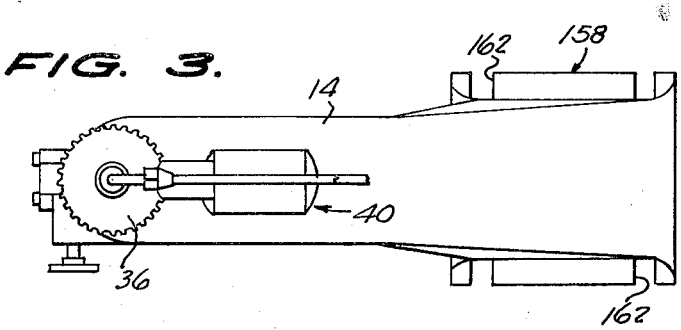
FIGURE 3 is a top plan view of FIGURE 2.

On the inner end of the standard 12 of the frame 10, is a fixed block 158, extending to opposite sides of the standard, which is formed with a longitudinal V-shaped groove 160, designed to straddle a pipe P, as shown in FIGURES 1 and 2. The block 158 is adapted to be clamped, or otherwise secured, in place on the pipe P, for its accommodation of which the block is provided on opposite sides thereof, with end notches 162.

In use and operation, the torch 106 having been adjusted to the required distance from the work to be cut, and having been adjusted to the angularity relative to the radius rod 30 necessary to define the diameter of the hole to be cut, the pointed inner end 164, of the radius rod is engaged in a previously made punch hole, in the work. The torch 106 is then ignited, the supplies of oxygen and acetylene being adjusted to provide the desired flame. The angularity of the torch can be selected to make either straight or bevelled edge holes. The flame from the torch is applied to the work and when the same has been properly heated, the motor is started, so that the flame is moved around the periphery of the hole to be cut, until the hole has been made.

In the case of producing saddling cuts, at the end of a pipe, semi-circular cuts are made in the diametrically opposite sides of the pipe, at the end thereof.

What is claimed is:

1. A device of the character described, comprising a frame having a work-engaging member, a radius rod journalled on the frame and laterally spaced from said work-engaging member, said rod having a pointed work-engaging end, said frame having a tubular housing fixed thereto and surrounding said rod, a fixed annular cam ring conforming in contour to the curvature of the surface of the work surrounding and supported on said housing, a cam arm block supported to move along the rod and to turn with the rod, a cam arm fixed to said block, said cam arm having opposed cam follower means engaged with opposite sides of the cam ring, a cutting torch assembly comprising a lateral member carried by and extending from said cam arm block, a torch carried by said lateral member, and means for rotating the radius rod.

2. A device according to claim 1, wherein said radius rod is formed with an axial blind bore, pipe means extending into said blind bore, said pipe means being adapted to lead from a source of torch fuel and reaching to the torch.

3. A device according to claim 1, wherein said rotating means comprises motor means on the frame operatively connected to the radius rod.

4. A device according to claim 1, wherein said cam arm block is formed with a bore receiving the radius rod, said cam arm being fixed to said block and spaced from a side of the radius rod.

5. A device according to claim 1, wherein said cam follower means comprises opposed rollers.

6. A device according to claim 1, wherein said lateral member comprises a rack bar sliding on the cam arm block, and a pinion journalled on the cam arm block and meshed with the rack bar.

7. A device according to claim 1, wherein said lateral member comprises a rack bar sliding on the cam arm block, and a pinion journalled on the cam arm block and meshed with the rack bar, said rack bar carrying a fixed housing, a second rack bar sliding in said fixed housing, a pinion journalled on the fixed housing and meshed with the second rack bar, said torch being carried by the second rack bar.

8. A device according to claim 1, wherein said lateral member comprises a rack bar sliding on the cam arm block, and a pinion journalled on the cam arm block and meshed with the rack bar, said rack bar carrying a fixed housing, a second rack bar sliding in said fixed housing, a pinion journalled on the fixed housing and meshed with the second rack bar, said torch being carried by the second rack bar, said torch being pivoted at one end of the second rack bar, a screw threaded through the other end of the second rack bar and pivoted to the torch at the other end thereof.

References Cited

UNITED STATES PATENTS 2,545,666   3/1951   Lonngren _____ 266—23

FOREIGN PATENTS 537,721   11/1931   Germany.
876,628   8/1942   France.

J. SPENCER OVERHOLSER, *Primary Examiner.*

R. D. BALDWIN, *Assistant Examiner.*